(12) United States Patent
Mishra et al.

(10) Patent No.: US 6,376,579 B1
(45) Date of Patent: Apr. 23, 2002

(54) LOW TEMPERATURE CURING, SAG-RESISTANT EPOXY PRIMER

(75) Inventors: Vinay Mishra, North Andover; Noredin Morgan, Billerica, both of MA (US)

(73) Assignee: Illnois Tool Works, Glenview, IL (US)

( * ) Notice: Subject to any disclaimer, the term of this patent is extended or adjusted under 35 U.S.C. 154(b) by 0 days.

(21) Appl. No.: 09/618,369

(22) Filed: Jul. 18, 2000

(51) Int. Cl.$^7$ .............................. C08K 3/36; C08L 63/02
(52) U.S. Cl. ........................ 523/466; 528/88; 528/119
(58) Field of Search .................. 523/466; 528/88, 528/119

(56) References Cited

U.S. PATENT DOCUMENTS

| | | | |
|---|---|---|---|
| 4,221,890 A | 9/1980 | Dimmick | 525/407 |
| 4,361,676 A | 11/1982 | Simpson | 525/118 |
| 4,729,696 A | 3/1988 | Goto et al. | 405/261 |
| 4,857,131 A | 8/1989 | Damico et al. | 156/331.4 |
| 5,059,656 A | 10/1991 | Tsuji | 525/155 |
| 5,206,288 A | 4/1993 | Gosiewski et al. | 525/83 |
| 5,262,479 A | 11/1993 | Tobing | 525/71 |
| 5,328,952 A | 7/1994 | Brodnyan et al. | 525/301 |
| 5,643,994 A | 7/1997 | Kish et al. | 524/533 |
| 5,945,461 A | 8/1999 | Gosiewski et al. | 521/123 |
| 5,965,635 A | 10/1999 | Rancich et al. | 523/176 |
| 5,994,464 A | 11/1999 | Ohsawa et al. | 525/85 |

OTHER PUBLICATIONS

American Paint & Coatings Journal, vol. 80, No. 21, 1996, pp. 49.

*Primary Examiner*—Robert Dawson
*Assistant Examiner*—D. Aylward
(74) *Attorney, Agent, or Firm*—Ernest V. Linek; Banner & Witcoff, Ltd.

(57) ABSTRACT

This invention relates to an epoxy composition especially designed for use as a primer for sealing and filling small pores in concrete. Advantageously, the composition is a low temperature curing, sag-resistant epoxy primer, which provides good adhesion to concrete and to a polyurea coating applied to the primed concrete. Advantageously the epoxy primer is curable at a temperature below 40° F. and comprises an admixture of two parts, Component A and Component B; wherein Component A comprises a crystallization resistant reactive epoxy resin and Component B comprises an amine curing agent. The resulting primer bonds to concrete at 200 psi or greater, when measured by ASTM D 4541.

27 Claims, No Drawings

LOW TEMPERATURE CURING, SAG-RESISTANT EPOXY PRIMER

FIELD OF THE INVENTION

This invention relates to an epoxy composition especially designed for use as a primer for sealing and filling small pores in concrete. Advantageously, the composition has the ability to cure at a low temperature (i.e., below about 32° F./0° C.), thereby extending the outdoor use of this sag-resistant epoxy primer through the winter months.

BACKGROUND OF THE INVENTION

Epoxy resins have long been used for the priming and repair of concrete surfaces. However, the application of these materials are typically conducted at temperatures above freezing, i.e., above 32° F. (0° C.), and not below that temperature due to curing problems often encountered at temperatures below 32° F.

previous attempts at preparing low temperature curing epoxy compositions have generally not progressed below about 40° F. (about 4.5° C.) as the low temperature cure cut-off point. For example, Rust-Oleum Corporation has advertised a low temperature activator (9103) for use with its System 9100 high performance epoxy resin. According to the company's Internet literature, when the 9103 activator is used in the 9100 system, the coating can be applied and cured at temperatures as low as 40° F. (about 4.5° C.), which is ten degrees lower than the curing temperature lower limit for their standard activator. The 9100 epoxy coating is claimed to be suitable for use on abrasive blasted steel, concrete and masonry surfaces.

In *American Paint& Coatings Journal*, Vol. 80, No. 21 1996, p. 49, the Cardolite Corporation discloses the properties of three phenalkamine epoxy hardeners for epoxy coatings which can be used for marine and offshore coatings, industrial maintenance, pipe and tank linings, drinking water applications and concrete protection. One formulation (NC-541LV) is said to promote rapid cure at temperatures as low as 5° C. (about 41° F.).

In U.S. Pat. No. 4,221,890, a concrete repair material is disclosed which comprises a 100% solids epoxyamine composition comprising an epoxy resin, an aliphatic polyamine, a first accelerator comprising Bisphenol-A, a second polyamine composition and a second accelerator. The concrete repair material is claimed to have a cure temperature within the range of at least as low as 0° F. (about −18° C.) and at least as high as 140° F. (about 60° C.).

The need for suitable materials which will permit further coatings and afford a strong bond to concrete, and cure at temperatures below 32° F. (0° C.) continues. The present invention satisfies that need.

SUMMARY OF THE INVENTION

The present invention is directed to an epoxy primer that helps bond a fast-cure polyurea sprayable coating to a concrete surface. The key requirements of the epoxy primer of the present invention are:

1) Curable at low temperatures, preferably below 55° F. (13° C.), more preferably below 40° F. (about 4.4° C.), and most preferably below about 32° F. (0° C.);
2) High sag resistance, so as to fill "bug" holes in vertical concrete surfaces. Holes can be as much as 1 inch in width and depth, and sometimes even larger;
3) Good adhesion to concrete; and
4) Good adhesion to additional coating compositions, particularly polyurea coatings, sprayed on top of cured primer.

The present invention provides a composition which satisfies these criteria. In general, the composition is a two part system; Component A comprising the reactive epoxy resin mixture and Component B comprising the hardener or curing agent mixture.

The two parts are mixed before application, then the mixed primer is applied to the concrete surfaces to be primed and filled. The primer mixture can be mixed and applied manually (e.g., by trowel or sponge float) or by use of automatic metering, mixing and dispensing equipment. In supplying the primer composition as a two part system, each part is supplied in a separate container.

Component A comprises the following ingredients:

(a) from 75 to 115 parts by weight of a compound containing at least one glycidyl ether epoxide group;

(b) from 1 to 10 parts by weight of a Michael's Addition agent, e.g., a polyfunctional acrylate monomer;

(c) from 0 to 1 part by weight of color concentrate (e.g., grey);

(d) from 0 to 10 parts by weight of filler and/or thickener materials; and (e) from 1 to 10 parts by weight of a diluent to maintain a low viscosity at low application temperatures.

Depending on the epoxy used, the diluent used, and the amount and types of thickeners and/or fillers used, viscosity of Component A may be in the range from 1000 cps to 300,000 cps, with a preferred range being 10,000 cps to 100,000 cps, and a most preferred range being 25,000 cps to 75,000 cps. One currently preferred embodiment has a viscosity of about 53,000 cps.

The epoxy resin used herein must resist crystallization and thickening at low temperatures, thereby allowing easy application of the primer. The reactive epoxy mixture of the present invention advantageously comprises a bisphenol-epichlorohydrin epoxy resin having an epoxy equivalent weight ranging from 150 to 250. The epoxy equivalent weight is defined as the weight in grams of the resin containing one gram equivalent of epoxide. Suitable epoxy resins of this type are commercially available from the Shell Chemical Company, Resins & Versatics Sales Office, Houston, Tex. under the trademark Epon®. The currently most preferred epoxy resins are Epon 862 and Epon 828.

In addition to the epoxy resin, Component A of the present invention further comprises at least one Michael's Addition agent. This agent is added to enhance the low temperature reaction with the curing agent. Suitable materials of this type include polyfunctional acrylate monomers which participate in a very rapid Michael's Addition reaction with the primary amine functional groups present in the curing agent. The addition of such a reactive agent assists the curing process at low temperatures, maintaining satisfactory cure rates even at temperatures of about 25° F. (about −4° C.) or less. One commercially available polyfunctional acrylate monomer of this type is Photomer 4399 from the Henkel Corporation.

As described above, Component A further comprises coloring agents, filler and/or thickener materials, and diluents. Examples of suitable filler and/or thickener materials include fumed silicas, and similar inorganic solids. Diluents include alcohols and the like. Currently preferred materials include Cab-O-Sil TS-720 and benzyl alcohol. Color concentrates for a variety of colors (e.g., grey) are widely available.

Component B comprises the following ingredients:
(aa) from 65 to 105 parts by weight of an amine-based hardener, for example, a Mannich Base curing agent;
(bb) from 12 to 18 parts by weight of an amine-based accelerator;
(cc) from 0 to 1 part by weight of a color concentrate (e.g., grey);
(dd) from 0 to 6 parts by weight of one or more thickener materials; and
(ee) from 4 to 6 parts by weight of a diluent to maintain a low viscosity at low application temperatures.

Depending on the materials used, the viscosity of Component B may be in the range from 100 cps to 100,000 cps, with a preferred range being 1000 cps to 50,000 cps, and a most preferred range being 10,000 cps to 50,000 cps. One currently preferred embodiment has a viscosity of about 14,400 cps.

The hardener or curing agent mixture (Component B) advantageously comprises components that react suitably with the reactive ingredients in the Component A mixture, to afford a suitable primer composition that will cure at temperatures below about 32° F. (0° C.). One preferred class of curing agents makes use of "Mannich Base" chemistry, which reacts rapidly with the Epon epoxy resins, and even more rapidly with the Photomer 4399, present in the resin mixture.

Mannich Bases, as preferred amine-based components of curing agent composition, are of value in reducing the cure time and they improve strength of the primer bonding. The amines for making Mannich Bases may be primary or secondary; they may be diamines or other polyamines. The Ancamine family of curing agents, commercially available from Air Products and Chemicals, Inc., Allentown, Pa., are within this class. In the present invention the preferred amine is triethylenetetramine (TETA). An especially preferred Mannich Base curing agent based upon TETA is Ancamine 1637.

Ancamine K54 (Air Products and Chemicals) and Capcure EH-30 (Henkel Corporation) are examples of a preferred amine-based accelerator for use herein. These products are the same material, namely 2,4,6-tri(dimethyl-aminomethyl)-phenol, a tertiary amine which catalyzes the epoxy curing reaction to high rates.

Diluents may be reactive or nonreactive. Alcohols have been found to be suitable for use as the nonreactive diluent in both Component A and Component B. Benzyl alcohol is an example of a preferred non-reactive diluent which keeps the viscosity low in cold environment. Reactive diluents have one or more functional groups that react with one or more of the other components in the mixture. Examples of suitable reactive diluents include epoxy-functional glycidyl ethers, for example, butyl-glycidyl ether, 2-ethylhexyl-glycidyl ether and cresyl-glycidyl ether, to name a few.

Fillers which may be used in either of the two parts include talc, kaolin, silica, aluminum and other metal powders, metal oxides, calcium carbonate and the like.

Thickening agents (i.e., thixotropic agents) include silicas and similar materials. Preferred thickening agents are the fumed silicas, such as those sold under the tradenames Cabosil (Cabot Corp.) or Aerosil (Degussa). Cab-O-Sil TS 720 has been found to be an especially preferred embodiment of the fumed silicas useful herein. Combinations of one or more thickeners and/or fillers may also be employed herein.

An especially preferred formulation meeting all of the above requirements can be prepared by mixing the following two component (resin and hardener) compositions:

Component A (Resin):

| Tradename | Parts By Weight | Weight Fraction |
|---|---|---|
| Epon Resin 862 | 95 | 0.8370 |
| Photomer 4399 | 5 | 0.0441 |
| Color Concentrate | 0.5 | 0.0044 |
| Cab-O-Sil TS-720 | 8 | 0.0705 |
| Benzyl Alcohol | 5 | 0.0441 |
| TOTAL | 113.50 | 1.0000 |

Component B (Hardener):

| Tradename: | Parts By Weight | Weight Fraction |
|---|---|---|
| Ancamine 1637 | 85 | 0.7692 |
| Color Concentrate | 0.5 | 0.0045 |
| Cab-O-Sil TS 720 | 5 | 0.0452 |
| Capcure EH-30 (Ancamine K54) | 15 | 0.1357 |
| Benzyl Alcohol | 5 | 0.0452 |
| Total | 110.50 | 1.0000 |

An especially preferred primer composition was prepared using 74.8 parts by weight of Component A and 25.2 parts by weight of Component B. This primer composition (100 grams) had a gel time at 75° F. (24° C.) of about six (6) minutes. The thin film set time (TFST) for this primer composition, at a temperature range of 25° to 32° F. (−4° to 0° C.), was from about eight (8) to sixteen (16) hours. The TFST at a temperature range of 40° to 50° F. (4.4° to 10° C.) was from about two (2) to six (6) hours.

The measured adhesion strength of this primer composition to polyurea was greater than 200 psi, preferably at least 300 psi, and most preferably at least 400 psi, as measured on an Elcometer using test method ASTM D 4541.

DETAILED DESCRIPTION OF THE PREFERRED EMBODIMENTS

As described above, the present invention is directed to an epoxy primer that helps bond a fast-cure polyurea sprayable coating to a concrete surface, particularly at temperatures below 55° F. (13° C.), preferably below about 40° F. (4.4° C.), and most preferably at about 32° F. (0° C.) or less.

In addition to low temperature curing, the other essential requirements of the epoxy primer of the present invention are (a) high sag resistance, so as to fill holes in vertical concrete surfaces without sagging. Typical "bug" holes in cured concrete can be as large as 1 inch in width and/or depth, and sometimes even larger. The primer must fill these holes and not fall out during the curing process. In connection with the filling requirement, good adhesion of the primer to concrete is an essential part of this invention. Finally, the primer must promote good adhesion of additional coating compositions, particularly polyurea coatings, sprayed on top of cured primer. Adhesion is measured using a standard test method, ASTM D 4541, and the primer shows adhesion values (Elcometer) of greater than 200 psi. Especially preferred embodiments of the present invention had an adhesion value of greater than 500 psi and most preferably greater than 600 psi.

Epoxide group-containing materials useful in the compositions of the invention are glycidyl ether derivatives having an oxirane ring polymerizable by ring opening. Such materials, broadly called glycidyl ether epoxides, include monomeric epoxy compounds and epoxides of the polymeric type. Peferably the epoxides have more than one epoxide group per molecule.

These epoxide group-containing materials can vary from low molecular weight monomeric materials to high molecular weight polymers and can vary in the nature of their backbone and substituent groups. Illustrative substituent groups include halogens, ethers, and siloxane groups. The molecular weight of the epoxy containing compound can vary from 150 to about 100,000 or more. Mixtures of various epoxy-containing materials can also be used in the composition of this invention. Especially preferred are liquid epoxies that resist crystallization at low temperatures, i.e., below about 55° F. (about 13° C.).

Such epoxide group-containing materials are well known and include such epoxies as glycidyl ether type epoxy resins and the diglycidyl ethers of bisphenol A or bisphenol F and their higher molecular weight analogs. The Epon® resins (Shell Chemical Company), particularly Epon 828 and 862 are preferred herein.

Epon 862 is an especially preferred example of an epoxy resin that resists crystallization and thickening at low temperatures, thereby allowing easy application of the primer. This liquid resin material has a room temperature (25° C.) viscosity of 30–45 P and the weight per epoxide is 166–177. Chemically, Epon Resin 862 is a liquid epoxy resin manufactured from epichlorohydrin and Bisphenol-F. The commercially available material contains no diluents or modifiers.

Photomer 4399, commercially available from the Henkel Corporation, is a medium viscosity dipentaerithritol monohydroxy pentaacrylate. This compound is commonly used as a diluent for UV and EB curable lacquers and UV curing agent pigmented coatings used in paper and board coatings, wood finishes and vinyl flooring. Photomer 4399 is also compatible with a variety of polyester, epoxy and urethane acrylate oligomers. Photomer 4399 is a preferred example of a polyfunctional acrylate monomer which participates in a very rapid, Michael's Addition reaction with the primary amine functional groups present in the curing agent, for example, Ancamine 1637. This chemical reaction proceeds even at the low temperature of 25° F. (about −4° C.), at a satisfactory speed.

Ancamine 1637 (Air Products and Chemicals, Inc.) is an example of an amine-based fast curing agent which reacts rapidly with Epon 862, and even more rapidly with the Photomer 4399, present in the resin side. Ancamine 1637 is commonly used in conjunction with standard liquid epoxies and/or epoxy novolacs for a variety of applications. Ancamine 1637 curing agent can also be used as an accelerator for other curing agents.

Ancamine K54 (Air Products & Chemicals) and Capcure EH-30 (Henkel Corporation) are examples of preferred amine-based accelerators which catalyze the epoxy curing reaction to high rates. Both of these products are a tertiary-amine accelerator and curing agent for epoxy resin systems. Fast cures are commonly obtained with this epoxy resin hardener and accelerator, particularly at room temperature.

CAB-O-SIL TS-720, commercially available from Cabot Corporation, is a high-purity fumed silica which has been treated with a dimethyl silicone fluid. The treatment replaces many of the surface hydroxyl groups on the fumed silica with a polydimethyl siloxane polymer. This treatment makes the silica extremely hydrophobic.

The present invention will be further illustrated with reference to the following examples which aid in the understanding of the present invention, but which are not to be construed as limitations thereof. All percentages reported herein, unless otherwise specified, are percent by weight. All temperatures are expressed in degrees Celsius.

Typical Properties of the Preferred Primer

The preferred primer composition comprises 74.8 parts by weight of Component A and 25.2 parts by weight of Component B.

Component A (Resin):

| Tradename | Parts By Weight | Weight Fraction | Amount (gm) |
|---|---|---|---|
| EPON Resin 862 | 95 | 0.8370 | 627.75 |
| PHOTOMER 4399 | 5 | 0.0441 | 33.04 |
| Color Concentrate | 0.5 | 0.0044 | 3.30 |
| CAB-O-SIL TS-720 | 8 | 0.0705 | 52.86 |
| Benzyl Alcohol | 5 | 0.0441 | 33.04 |
| Totals | 113.50 | 1.0000 | 750.00 |

Component A, when mixed at room temperature at a mixing speed of 5 rpm, had a viscosity of 285,000 cps. When mixed at 50 rpm, the room temperature viscosity was 53,000 cps.

Component B (Hardener):

| Tradename: | Parts By Weight | Weight Fraction | Amount (gm) |
|---|---|---|---|
| Ancamine 1637 | 85 | 0.7692 | 218.54 |
| Color Concentrate | 0.5 | 0.0045 | 1.29 |
| Cab-O-Sil TS 720 | 5 | 0.0452 | 12.86 |
| Ancamine K54 | 15 | 0.1357 | 38.57 |
| Benzyl Alcohol | 5 | 0.0452 | 12.86 |
| Totals | 110.50 | 1.0000 | 284.10 |

Component B, when mixed at room temperature at a mixing speed of 5 rpm, had a viscosity of 33,600 cps. When mixed at 50 rpm, the room temperature viscosity was 14,400 cps.

When Component A (74.8 pbw) and Component B (25.2 pbw) were mixed together at 75° F., 100 grams had a gel time of six (6) minutes. The thin film set time (TFST) was from about 8 to 16 hours at 25° F. to 32° F. and about 2 to 6 hours at 40° F. to 50° F. The adhesion test of the primer, i.e., both to the concrete substrate and a polyurea spray overcoat, using test method ASTM D 4541, was greater than 200 psi.

Once mixed together as a primer composition, the "pot life" of the composition becomes very important. The "pot life" is a temperature dependent physical property of the primer, namely the time during which the primer composition may be applied to a concrete surface in a satisfactory manner {working time), yielding satisfactory performance characteristics. The data shown below are reflective of the temperature influence on pot life:

| Working Time | Temp | Mixed Volume/Weight |
|---|---|---|
| 6 minutes | 77° F. | 100 grams |
| 30 minutes | 40° F. | 1 quart |
| 30–40 minutes | 32° F. | 2–3 gallons |

Finally, the primer "recoat window" was measured. The "recoat window" is defined as the range of elapsed time (in hours) from the primer application during which a coating of polyurea can be sprayed onto the cured primer, while retaining optimum adhesion results. As set forth above, this means an adhesion value as measured by ASTM D 4541 of at least 200 psi, preferably at least 300 psi, more preferably at least 400 psi, and most preferably at least 500 psi. Preliminary data regarding the recoat window, showing both the minimum time period and the maximum time period (in hours) at various temperatures are provided below:

|  | Recoat Window (hr) | |
| --- | --- | --- |
| Cure Temp | Minimum | Maximum |
| 32° F. | 12 | 72 |
| 40° F. | 8 | 36 |
| 55° F. | 2 | 24 |

The present invention has been described in detail, including the preferred embodiments thereof. However, it will be appreciated that those skilled in the art, upon consideration of the present disclosure, may make modifications and/or improvements on this invention and still be within the scope and spirit of this invention as set forth in the following claims.

What is claimed is:

1. An epoxy primer for concrete, said primer being curable at a temperature below 55° F.; said primer comprising an admixture of two parts, Component A and Component B, wherein Component A comprises a crystallization resistant reactive epoxy resin mixture and Component B comprises a curing agent mixture; said primer bonding to concrete at 200 psi or greater, when measured by ASTM D 4541;

wherein Component A comprises the following ingredients:
   (a) from 75 to 115 parts by weight of a compound containing at least one glycidyl ether epoxide group;
   (b) from 1 to 10 parts by weight of a Michael's Addition agent;
   (c) from 0 to 1 part by weight of a color concentrate;
   (d) from 0 to 10 parts by weight of filler and/or thickener materials; and
   (e) from 1 to 10 parts by weight of a diluent;
and wherein Component B comprises the following ingredients:
   (aa) from 65 to 105 parts by weight of a Mannich Base curing agent;
   (bb) from 12 to 18 parts by weight of an amine-based hardener and accelerator;
   (cc) from 0 to 1 part by weight of a color concentrate;
   (dd) from 4 to 6 parts by weight of one or more filler and/or thickener materials; and
   (ee) from 4 to 6 parts by weight of a diluent.

2. The epoxy primer of claim 1, said primer being curable at a temperature below 40° F.

3. The epoxy primer of claim 1, said primer being curable at a temperature below about 32° F.

4. The epoxy primer of claim 1, wherein the viscosity of Component A ranges from 1000 cps to 300,000 cps.

5. The epoxy primer of claim 1, wherein the viscosity of Component A ranges from 10,000 cps to 100,000 cps.

6. The epoxy primer of claim 1, wherein the viscosity of Component A ranges from 25,000 cps to 75,000 cps.

7. The epoxy primer of claim 1, wherein the reactive epoxy mixture of Component A comprises a bisphenol-epichlorohydrin epoxy resin having an epoxy equivalent weight ranging from 150 to 250.

8. The epoxy primer of claim 7, wherein the bisphenol is bisphenol A.

9. The epoxy primer of claim 7, wherein the bisphenol is bisphenol F.

10. The epoxy primer of claim 1, wherein the Michael's Addition agent comprises one or more polyfunctional acrylate monomers.

11. The epoxy primer of claim 1, wherein the thickener material comprises fumed silica.

12. The epoxy primer of claim 1, wherein the diluent comprises an alcohol.

13. The epoxy primer of claim 1, wherein the diluent comprises an epoxy-functional glycidyl ether.

14. The epoxy primer of claim 1, wherein Component A consists essentially of the following materials:
   95 parts by weight of a liquid epoxy resin made from epichlorohydrin and Bisphenol F—the reaction product of phenol and formaldehyde;
   5 parts by weight of dipentaerithritol monohydroxy pentaacrylate;
   0.5 parts by weight color concentrate;
   8 parts by weight of fumed silica treated with dimethyl silicone fluid to make the material hydrophobic;
   and 5 parts by weight benzyl alcohol.

15. The epoxy primer of claim 1, wherein the viscosity of Component B ranges from 100 cps to 100,000 cps.

16. The epoxy primer of claim 1, wherein the viscosity of Component B ranges from 1000 cps to 50,000 cps.

17. The epoxy primer of claim 1, wherein the viscosity of Component B ranges from 10,000 cps to 25,000 cps.

18. The epoxy primer of claim 16, wherein Component B consists essentially of the following materials:
   85 parts by weight of a Mannich base epoxy curing agent formed by reacting phenol and formaldehyde with triethylenetetramine;
   0.5 parts by weight color concentrate;
   5 parts by weight of fumed silica treated with dimethyl silicone fluid to make the material hydrophobic;
   15 parts by weight of 2,4,6-tri(dimethylaminomethyl) phenol;
   and 5 parts by weight benzyl alcohol.

19. A primer composition for concrete comprising 74.8 parts by weight of Component A and 25.2 parts by weight of Component B;
   wherein Component A consists essentially of the following materials:
   95 parts by weight of a liquid epoxy resin made from epichlorohydrin and Bisphenol F—the reaction product of phenol and formaldehyde;
   5 parts by weight of dipentaerithritol monohydroxy pentaacrylate;
   0.5 parts by weight color concentrate;
   8 parts by weight of fumed silica treated with dimethyl silicone fluid to make the material hydrophobic;
   and 5 parts by weight benzyl alcohol; and
   wherein Component B consists essentially of the following materials:
   85 parts by weight of a Mannich base epoxy curing agent formed by reacting phenol and formaldehyde with triethylenetetramine;
   0.5 parts by weight color concentrate;
   5 parts by weight of fumed silica treated with dimethyl silicone fluid to make the material hydrophobic;
   15 parts by weight of 2,4,6-tri(dimethylaminomethyl) phenol:
   and 5 parts by weight benzyl alcohol.

20. The primer composition of claim 19, wherein the thin film set time at a temperature range of 25° to 32° F. (−4° to 0° C.) was from about 8 to 16 hours.

21. The primer composition of claim 19, wherein the thin film set time at a temperature range of 40° to 50° F. (4.4° to 10° C.) was from about 2 to 6 hours.

22. The primer composition of claim 19, wherein the temperature dependent working time or pot life is as follows:

| Working Time | Temp | Mixed Volume/Weight |
| --- | --- | --- |
| 6 minutes | 77° F. | 100 grams |
| 30 minutes | 40° F. | 1 quart |
| 30–40 minutes | 32° F. | 2–3 gallons. |

23. The composition of claim 19, wherein the measured adhesion strength of the primer composition to a top-coating of polyurea was greater than 200 psi, as measured on an Elcometer, using test method ASTM D 4541.

24. The primer composition of claim 19, wherein the measured adhesion strength of the primer composition to a top-coating of polyurea was greater than 400 psi, as measured on an Elcometer, using test method ASTM D 4541.

25. The primer composition of claim 19, wherein the measured adhesion strength of the primer composition to a coating of polyurea was greater than 600 psi, as measured on an Elcometer, using test method ASTM D 4541.

26. The primer composition of claim 19, wherein the temperature variation for the polyurea recoat window, as measured in hours, is as follows:

| Cure Temp | Minimum | Maximum |
| --- | --- | --- |
| 32° F. | 12 | 72 |
| 40° F. | 8 | 36 |
| 55° F. | 2 | 24. |

27. An epoxy primer for concrete, said primer being curable at a temperature below 40° F.; said primer comprising an admixture of two parts, Component A and Component B, wherein Component A comprises a crystallization resistant reactive epoxy resin and Component B comprises an amine curing agent; said primer bonding to concrete at 200 psi or greater,when measured by ASTM D 4541 and wherein the measured adhesion strength of the primer composition to a top-coating of polyurea was greater than 200 psi, as measured on an Elcometer, using test method ASTM D 4541.

* * * * *

UNITED STATES PATENT AND TRADEMARK OFFICE
CERTIFICATE OF CORRECTION

PATENT NO. : 6,376,579 B1  
DATED : April 23, 2002  
INVENTOR(S) : Vinay Mishra and Noredin Morgan It is certified that error appears in the above-identified patent and that said Letters Patent is hereby corrected as shown below:

<u>Title page,</u>  
Item [73], change "Illnois Tool Works" to -- Illinois Tool Works Inc. --.

Signed and Sealed this

Second Day of July, 2002

Attest:

Attesting Officer

JAMES E. ROGAN  
*Director of the United States Patent and Trademark Office*